(12) United States Patent
Iga

(10) Patent No.: US 6,850,879 B1
(45) Date of Patent: Feb. 1, 2005

(54) MICROCOMPUTER WITH EMULATOR INTERFACE

(75) Inventor: Kiichiro Iga, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 703 days.

(21) Appl. No.: 09/702,892

(22) Filed: Nov. 1, 2000

(30) Foreign Application Priority Data

May 19, 2000 (JP) .................................. 2000-147749

(51) Int. Cl.⁷ ............................................. G06F 17/50
(52) U.S. Cl. ............................. 703/19; 703/21; 703/27; 713/400; 712/32
(58) Field of Search ........................ 703/21, 19, 24, 703/27; 712/32; 713/400; 711/167

(56) References Cited

U.S. PATENT DOCUMENTS

| | | | | |
|---|---|---|---|---|
| 4,771,282 A | * | 9/1988 | Hamano et al. ....... | 340/825.22 |
| 5,455,923 A | * | 10/1995 | Kaplinsky ................ | 711/154 |
| 6,134,379 A | * | 10/2000 | LaMacchia ............... | 386/54 |
| 6,598,148 B1 | * | 7/2003 | Moore et al. ............. | 712/32 |

* cited by examiner

Primary Examiner—Albert W. Paladini
(74) Attorney, Agent, or Firm—Staas & Halsey LLP

(57) ABSTRACT

A microcomputer includes a processor and an emulator interface circuit that provides processor state information to an external emulator. The emulator interface circuit operates at a clock speed that is lower than the clock speed of the processor and provides the state information at predetermined intervals, such as after a predetermined number of processor clock pulses. The state information may also be provided after a specified number of instruction fetches have occurred.

17 Claims, 4 Drawing Sheets

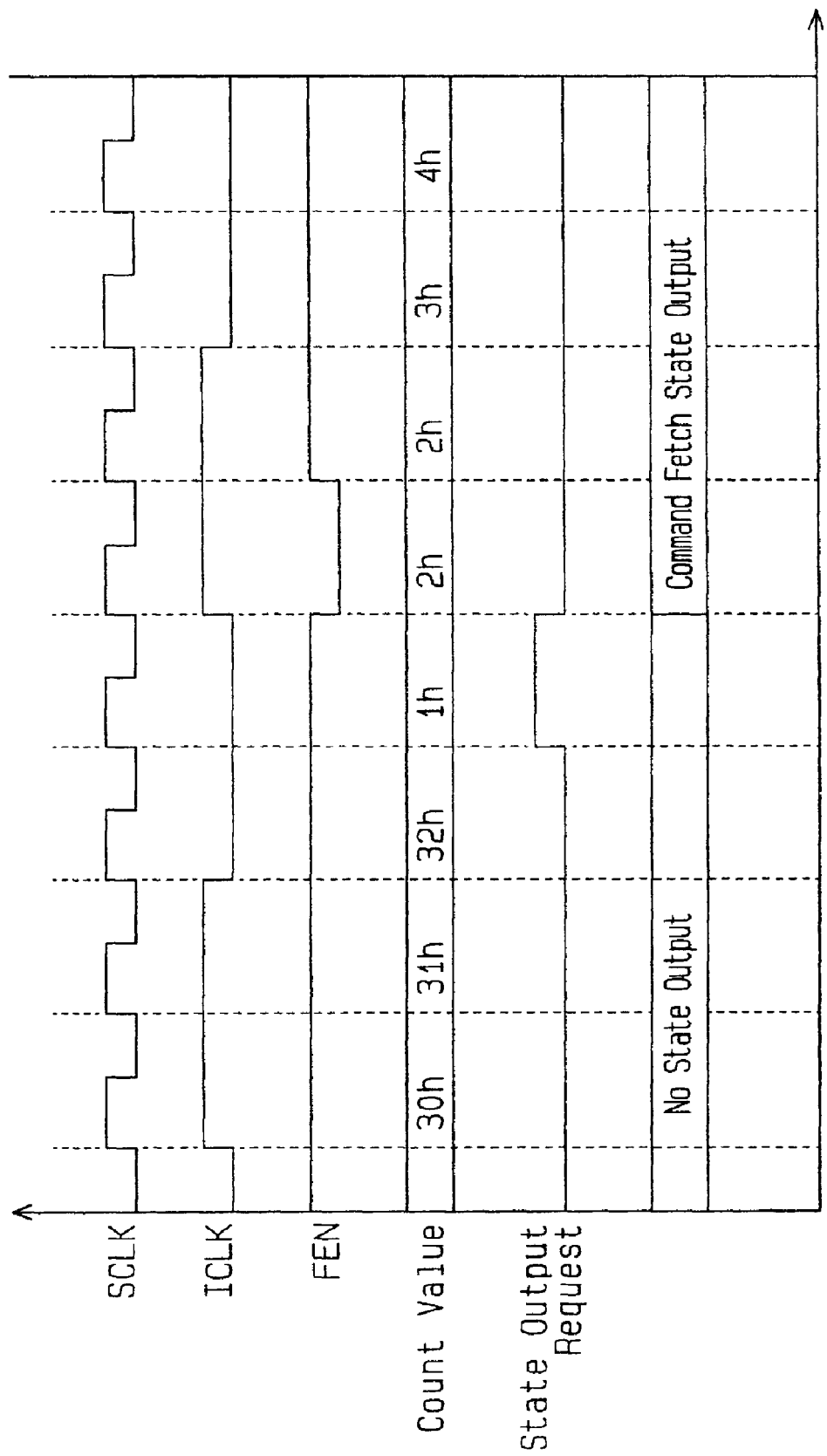

MICROCOMPUTER WITH EMULATOR INTERFACE

BACKGROUND OF THE INVENTION

The present invention relates to microcomputers, and more particularly, to a microcomputer incorporating a device that provides an external apparatus with operation information of a CPU to externally monitor the operation of the CPU.

To respond to the recent request for high-speed microcomputers, a microcomputer includes a CPU and a memory device, such as a PROM, for storing programs executed by the CPU. To check the operation of the microcomputer and debug the programs, the microcomputer has a device for providing the operation information of the CPU to an external monitoring apparatus, such as an emulator. The device provides the operation information to the emulator at a speed corresponding to the operation of the CPU.

FIG. 1 is a schematic block diagram of a prior art microcomputer 11. The microcomputer 11 includes a CPU 12 and an emulator interface 13, which provides operation information of the CPU 12 to an external emulator device (not shown). The CPU 12 and the emulator interface 13 are formed on the same semiconductor integrated circuit substrate together with memory devices (not shown), such as a PROM, and peripheral circuits.

The CPU 12 and the interface 13 are operated in accordance with a system clock SCLK. Further, in response to a control signal provided by the external emulator device, the CPU 12 provides its operation information to the emulator device via the interface 13. Based on the operation information, the emulator device monitors the operation of the CPU 12.

For real-time transmission of the CPU operational information to the emulator device, the high-speed microcomputer 11 requires a high-performance cable that enables data to be transmitted at the operation frequency of the microcomputer 11. Such high-performance cable is expensive and increases the cost for manufacturing microcomputers.

Therefore, a plurality of inexpensive cables are used to connect the microcomputer 11 to the external emulator device. Signals representing the operation information of the CPU 12 are transferred through the plurality of cables in a time-sharing and parallel manner. In this case, the interface frequency is lower than the operating frequency of the microcomputer 11. The connection of the inexpensive cables, however, increases the number of interface terminals and causes the microcomputer 11 to be expensive.

In another transmission method, a buffer is arranged between the CPU 12 and the interface 13 to temporarily store the operation information. The operation information is provided to the external emulator device from the buffer at a low speed. Thus, the operation information may be transferred by a small number of inexpensive cables. However, due to the difference between the operating speed of the CPU 12 and the interface speed of the interface 13, a buffer having a large capacity is required. Since the number of gates of the microcomputer increases in accordance with the capacity of the buffer, the cost of the microcomputer increases.

SUMMARY OF THE INVENTION

It is an object of the present invention to provide a microcomputer that prevents costs from increasing while providing an external device with the operation information of a high-speed CPU.

To achieve the above object, the present invention provides a microcomputer including a processor for fetching a program command in accordance with a first clock signal and executing the command. The processor generates a command fetch signal when fetching the program command. A fetch counter is connected to the processor to count pulses of the first clock signal and generate an output request for processor operation information based on the count value. An interface circuit is connected to the fetch counter to output the operation information in response to the output request.

A second aspect of the present invention provides a method for providing operation information of a processor incorporated in a microcomputer to an external device. The method includes fetching and executing a program command with the processor in accordance with a first clock signal, generating a command fetch signal with the processor when fetching the program command, counting the first clock signal with a fetch counter connected to the processor in response to the command fetch signal, generating an operation information output request in accordance with the count value of the fetch counter, and outputting the operation information from the processor to the external device via an interface circuit connected to the processor in response to the output request.

Further aspect of the present invention provides a computer system having a microcomputer and an emulator device. The microcomputer includes a processor for fetching a program command in accordance with a first clock signal and executing the command. The processor generates a command fetch signal when fetching the program command. A fetch counter is connected to the processor to count pulses of the first clock signal and generate an output request for processor operation information based on the count value. An interface circuit is connected to the fetch counter to output the operation information in response to the output request. The emulator device is connected to the interface circuit and monitors the operation of the microcomputer based on the operation information.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 4 is a waveform chart of the signals of the microcomputer of FIG. 2.

DETAILED DESCRIPTION OF THE PREFERRED EMBODIMENTS

Figure 1:
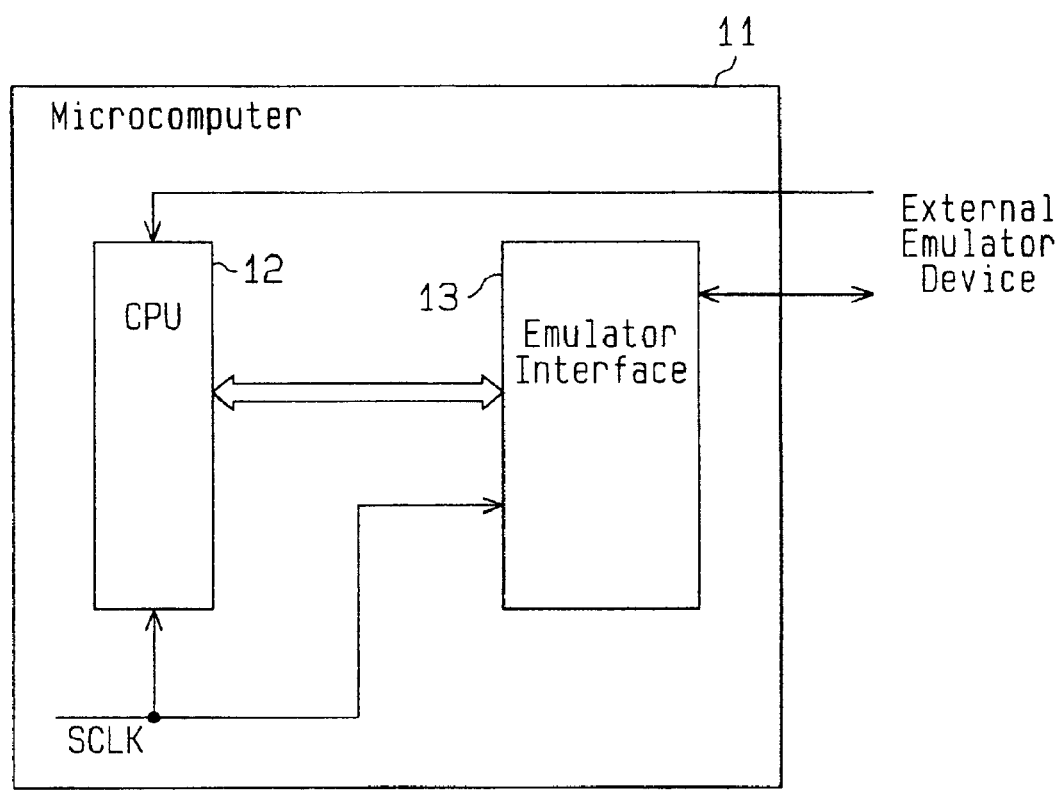
FIG. 1 is a schematic block diagram showing a prior art microcomputer.
Figure 2:
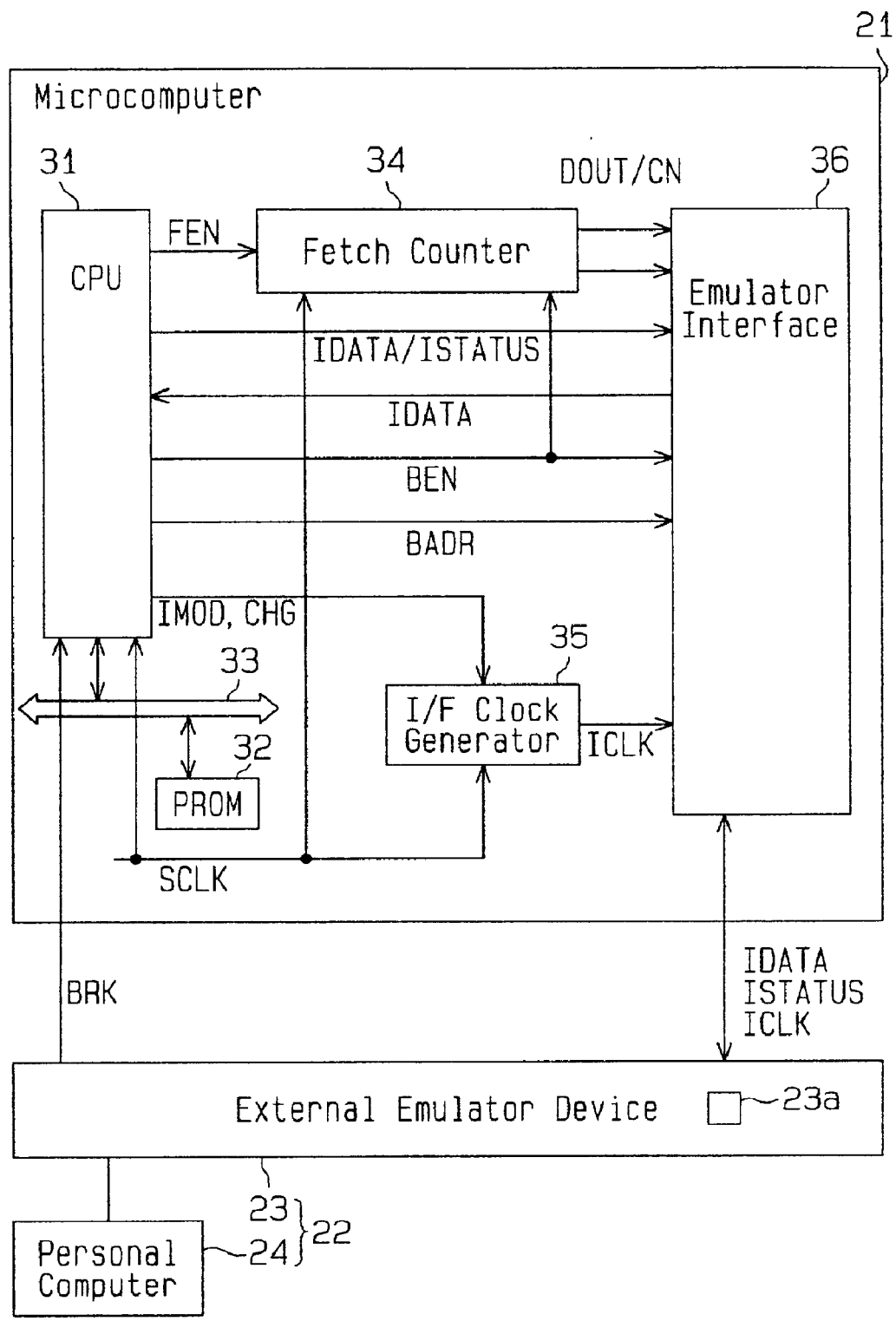
FIG. 2 is a schematic block diagram showing a microcomputer according to a preferred embodiment of the present invention.

FIG. 2 is a schematic block diagram showing a microcomputer 21 according to a preferred embodiment of the present invention. The microcomputer 21 is connected to an external monitoring apparatus 22, which includes an external emulator device 23 and a personal computer 24. The external monitoring apparatus 22 monitors the operation of the microcomputer 21.

The microcomputer 21 includes a CPU 31, a programmable ROM (PROM) 32 interconnected to the CPU 31 by a system bus 33, a fetch counter 34, an interface clock generator 35, and an emulator interface 36. The CPU 31 fetches a program command stored in the PROM 32 in accordance with a system clock SCLK and executes the command.

The interface clock generator 35 receives an emulator mode signal IMOD and a frequency change signal CHG, which are provided by the CPU 31, and the system clock SCLK. The frequency change signal CHG indicates a dividing ratio of the system clock SCLK. The interface clock generator 35 divides the system clock SCLK in accordance with the frequency change signal CHG to generate an interface clock ICLK having a frequency designated by the CPU 31. Then, the interface clock generator 35 provides the emulator interface 36 with the clock ICLK in response to the mode signal IMOD. The emulator interface 36 provides a signal indicating the operation state of the CPU 31 to the external emulator device 23 in accordance with the interface clock ICLK.

The fetch counter 34 counts the number of commands fetched by the CPU 31. When the fetched command number of the CPU 31 reaches a reference value, the fetch counter 34 provides the emulator interface 36 with the operation information (fetched command information) of the CPU 31.

More specifically, the CPU 31 provides the fetch counter 34 with a command fetch signal FEN, which indicates whether or not a command has been fetched, in synchronism with the system clock SCLK. For example, if the CPU 31 fetches a command, the CPU 31 causes the command fetch signal FEN to go high, and if the CPU 31 does not fetch a command, the CPU 31 causes the command fetch signal FEN to go low.

The fetch counter 34 receives the system clock SCLK and the command fetch signal FEN and counts the pulses of the system clock SCLK. If the command fetch signal FEN provided to the fetch counter 34 is high, the fetch counter 34 adds one (+1) to a count value CN in an incremental manner whenever the system clock SCLK rises. Accordingly, the count value CN indicates the number of commands fetched by the CPU 31.

Further, the fetch counter 34 compares the count value CN with a reference value. When the count value CN is equal to the reference value, the fetch counter 34 provides the emulator interface 36 with an output request DOUT of the command fetch state information and resets the count value CN. When receiving the output request DOUT, the interface 36 provides the command fetch state information to the external emulator device 23 based on the interface clock ICLK. Accordingly, the external emulator device 23 is provided with the command fetch state information whenever the command fetch state information output request DOUT is generated (i.e., whenever the number of command fetches reaches the reference value). This allows the interface 36 to operate at a lower speed than that of the CPU 31.

When receiving the command fetch state information, the external emulator device 23 advances a program counter 23a by a predetermined value. The program counter 23a traces the operation of the CPU 31. The external monitoring apparatus 22 monitors the state of the programs executed by the CPU 31 from the program counter 23a.

When a branch of the program routine occurs during execution of a program, the CPU 31 provides the fetch counter 34 and the interface 36 with a branch occurrence signal BEN, which indicates the occurrence of a program routine branch, and provides the interface 36 with a branch designation address BADR. The fetch counter 34 provides the interface 36 with the count value CN, as the command fetch state information, in response to the branch occurrence signal BEN. The interface 36 provides the external emulator device 23 with the count value CN and the branch designation address BADR, as the operation information of the CPU 31, in response to the branch occurrence signal BEN.

The external emulator device 23 checks the operation of the CPU 31 based on the command fetch state information, the count value CN, and the branch designation address BADR. More specifically, the external emulator device 23 advances the program counter 23a by the count value CN. This enables the external emulator device 23 to determine at which command the branch occurred. The external emulator device 23 then sets the program counter 23a to the branch designation address BADR. In this manner, the external monitoring apparatus 22 traces the branch operation of the CPU 31.

The external emulator device 23 provides the CPU 31 with a break signal BRK. The CPU 31 stops in response to the break signal BRK. As a result, the external monitoring apparatus 22 is able to stop the CPU 31 at a desired break point.

Further, the external monitoring apparatus 22 provides control emulation data IDATA to the CPU 31 via the interface 36. On the other hand, the CPU 31 provides the emulation data IDATA and status data ISTATUS to the external monitoring apparatus 22 via the interface 36. This enables the external monitoring apparatus 22 to operate the CPU 31 from a given address and receive information of internal registers of the CPU 31.

Based on the emulation data IDATA from the external emulator device 23, the CPU 31 provides the interface clock generator 35 with frequency change signal CHG. This ensures receipt of the operation information of the CPU 31, which is operated at a high frequency, by the external emulator device 23.

When the monitoring (program trace) of the operation of the CPU 31 is started, data is transferred between the external emulator device 23 and the CPU 31 via the interface 36. The interface clock generator 35 increases the value of the dividing ratio in accordance with the frequency change signal CHG to generate the interface clock ICLK with a low frequency. The fetch counter 34 varies a predetermined value, which determines the output timing of the output request of the command fetch state information based on the frequency change signal CHG. This enables the low speed external emulator device 23 to receive the operation information transferred from the CPU 31 in accordance with the low frequency interface clock ICLK and still monitor the operation of the CPU 31 regardless of the operation frequency of the CPU 31.

Figure 3:
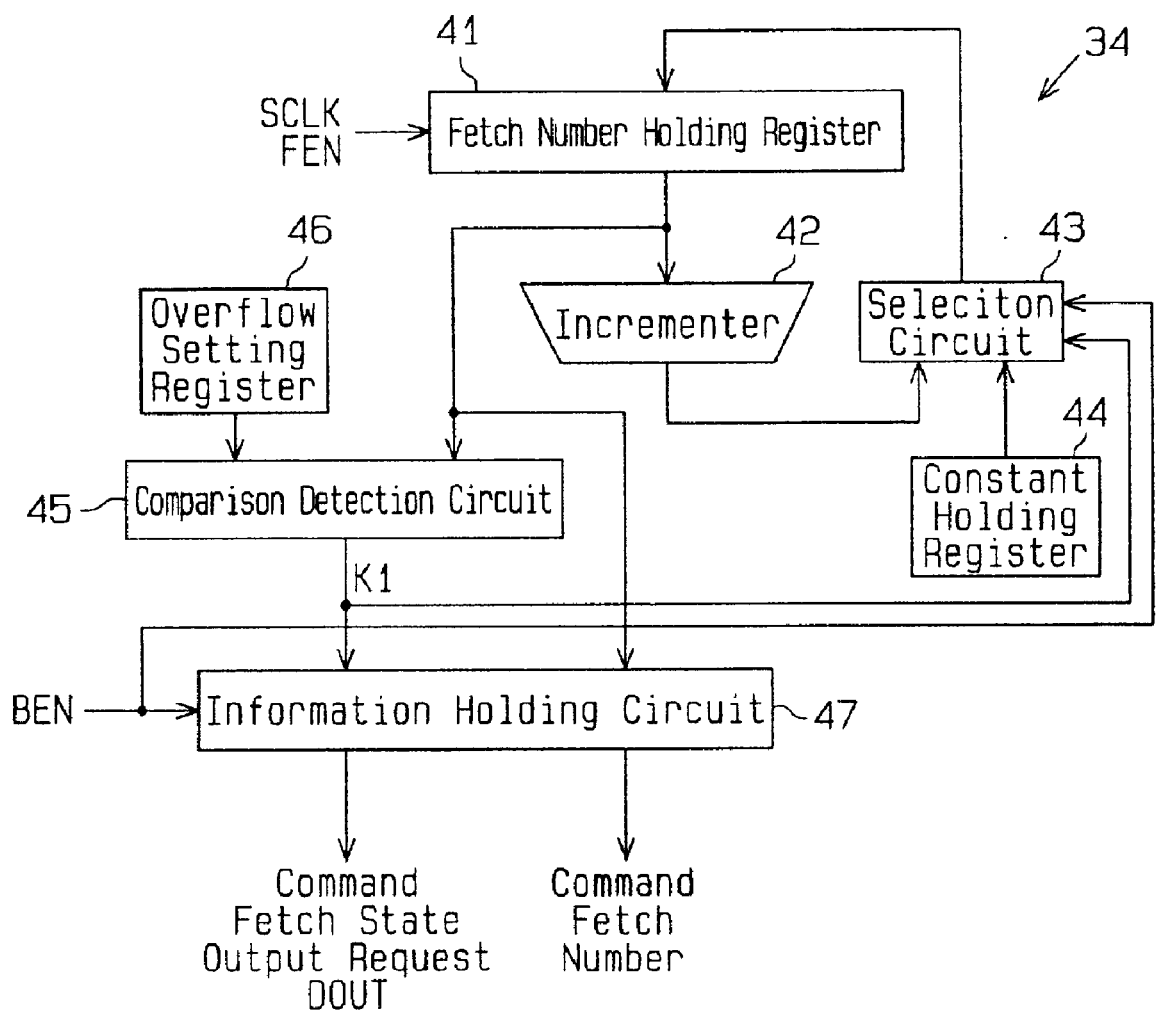
FIG. 3 is a schematic block diagram showing a fetch counter of the microcomputer of FIG. 2.

FIG. 3 is a schematic block diagram of the fetch counter 34. The fetch counter 34 includes a fetch number holding register 41, an incrementer 42, a selection circuit 43, a constant holding register 44, a comparison detection circuit 45, an overflow setting register 46, and an information holding circuit 47.

The fetch number holding register 41 receives the system clock SCLK and the command fetch signal FEN, holds an input signal when the command fetch signal FEN is high in accordance with the system clock SCLK, and provides the input signal to the incrementer 42, the comparison detection circuit 45, and the information holding circuit 47. The incrementer 42 adds one (+1) in an incremental manner to the input signal provided from the holding register 41 and provides the increment signal to the selection circuit 43. The constant holding register 44 provides the selection circuit 43 with a constant signal that has the value of one. A comparison output signal of the comparison detection circuit 45 and the branch occurrence signal BEN are provided to the selection circuit 43 as selection signals. The selection circuit 43 provides the fetch number holding register 41 with the increment signal or the constant signal in response to the selection signal. In this manner, the holding register 41 outputs a count value indicating the fetch number. The fetch number holding register 41, the incrementer 42, the selection circuit 43, and the constant holding register 44 form an increment counter.

The comparison detection circuit 45 reads a predetermined reference value, which is stored in the overflow setting register 46. The reference value is used to determine the output timing of the output request DOUT of the command fetch state information and is determined by the CPU 31 in accordance with the difference between the operating speed of the CPU 31 and the interface speed (transmission speed) of the interface 36. Accordingly, the reference value may be varied when necessary.

The comparison detection circuit 45 compares the count value of the holding register 41 with the reference value and provides a detection signal K1, which corresponds to the comparison result, to the selection circuit 43 and the information holding circuit 47.

The selection circuit 43 provides the fetch number holding register 41 with the constant signal when the count value matches the reference value. This resets the count value of the fetch number holding register 41 to one.

The information holding circuit 47 is provided with a count value from the fetch number holding register 41, the detection signal K1 from the comparison detection circuit 45, and the branch occurrence signal BEN. The information holding circuit 47 outputs the output request DOUT of the command fetch state information in response to the detection signal K1. Further, the information holding circuit 47 outputs the count value as the fetched command number in response to the branch occurrence signal BEN.

The branch occurrence signal BEN is provided to the selection circuit 43. The selection circuit 43 provides the holding register 44 with the constant signal in response to the branch occurrence signal BEN. This resets the count value when a branch occurs.

The operation of the microcomputer 21 will now be described with reference to FIG. 4. FIG. 4 shows a case in which the interface clock generator 35 divides the system clock SCLK by four to generate the interface clock ICLK. The overflow setting register 46 stores an overflow value of 32h (h represents hexadecimal).

When the count value matches the reference value, the fetch counter 34 causes the output request DOUT of the command fetch state information to go high in response to rising edge of the system clock SCLK and resets the count value to 1h.

When the output request DOUT of the command fetch state information goes high, the emulator interface 36 provides the command fetch state information to the external emulator device 23 in response to the rising edge of the interface clock ICLK.

The microcomputer 21 of the preferred embodiment has the advantages described below.

(1) The CPU 31 notifies the fetch counter 34 of the command fetch information, and the fetch counter 34 counts the number of fetched commands. When the fetch number reaches a predetermined value, the fetch counter 34 notifies the interface 36 of the output request DOUT of the command fetch state information. Thus, since the command fetch information is not transferred every system clock cycle, the operation speed of the interface 36 may be lower than that of the CPU 31. Further, since a buffer for temporarily holding the operation information is not needed, the number of gates of the microcomputer 21 is not increased.

(2) The CPU 31 is operated in accordance with the system clock SCLK. The interface clock generator 35 generates the interface clock ICLK, which frequency is designated by the CPU 31. The interface 36 notifies the external emulator device 23 of the operation information of the CPU 31 in accordance with the interface clock ICLK. As a result, the operation speed of the CPU 31 may be increased. Further, the operation state of the CPU 31 is monitored with the conventional external monitoring apparatus 22. Accordingly, equipment costs are not increased.

(3) The external monitoring apparatus 22 easily traces the occurrence of a branch and the operation of the CPU 31 based on the branch occurrence signal BEN, the branch designation address BADR, and the count value (fetched command number) of the fetch counter 34.

The structure of the fetch counter 34 may be changed as required.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

What is claimed is:

1. A microcomputer comprising:
 a processor fetching a program command in accordance with a first clock signal and executing the command, wherein the processor generates a command fetch signal when fetching the program command;
 a fetch counter connected to the processor to count pulses of the first clock signal based on the command fetch signal, and generate an output request for processor operation information based on the count value; and
 an interface circuit connected to the fetch counter to output the operation information in response to the output request.

2. The microcomputer according to claim 1, wherein the fetch counter compares the count value with a predetermined reference value, the fetch counter outputting the output request and resetting the count value when the count value matches the reference value.

3. The microcomputer according to claim 2, wherein the fetch counter includes a register for storing the variable reference value.

4. The microcomputer according to claim 3, wherein the reference value is determined in accordance with a difference between the operating speed of the processor and the transferring speed of the interface circuit.

5. The microcomputer according to claim 1, wherein, when a branch occurs during execution of the program command by the processor, the processor provides a branch occurrence signal to the fetch counter and the interface circuit and a branch designation address to the interface circuit, and wherein the fetch counter provides the interface circuit with the count value as a fetched command number in response to the branch occurrence signal, and the interface circuit outputs the branch designation signal and the fetched command number as the processor operation information in response to the branch occurrence signal.

6. The microcomputer according to claim 1, further comprising a clock generator connected to the processor and the interface circuit to divide the first clock signal and generate a second clock signal, which frequency is lower than that of the first clock signal, and provide the second clock signal to the interface circuit, wherein the interface circuit outputs the processor operation information in accordance with the second clock signal.

7. The microcomputer according to claim 6, wherein the processor provides the clock generator with a mode signal indicating the timing for providing the second clock signal to the interface circuit.

8. The microcomputer according to claim 6, wherein the processor provides the clock generator with a frequency change signal designating a dividing ratio of the second clock signal.

9. The microcomputer according to claim 1, wherein the fetch counter counts in synchronism with the first clock when the command fetch signal is active.

10. A method for providing operation information of a processor incorporated in a microcomputer to an external device, the method comprising:
  fetching and executing a program command with the processor in accordance with a first clock signal;
  generating a command fetch signal with the processor when fetching the program command;
  counting the first clock signal with a fetch counter connected to the processor in response to the command fetch signal;
  generating an operation information output request in accordance with the count value of the fetch counter; and
  outputting the operation information from the processor to the external device via an interface circuit connected to the processor in response to the output request.

11. The method according to claim 10, wherein the generating the operation information output includes the stops of:
  comparing the count value with a predetermined reference value;
  generating the output request when the count value matches the reference value; and
  resetting the count value.

12. The method according to claim 11, further comprising:
  varying the reference value in accordance with a difference between the operating speed of the processor and the transferring speed of the interface circuit; and
  storing the reference value in a register.

13. The method according to claim 10, further comprising:
  providing a branch occurrence signal to the fetch counter and the interface circuit and a branch designation address to the interface circuit when a branch occurs during execution of the program command by the processor;
  providing the interface circuit with the count value when receiving the branch occurrence signal as a fetched command number in response to the branch occurrence signal; and
  outputting the branch designation address and the fetched command number as the processor operation information in response to the branch occurrence signal.

14. The method according to claim 10, further comprising:
  dividing the first clock signal to generate a second clock signal having a frequency that is lower than that of the first clock signal; and
  providing the interface circuit with the second clock signal, wherein the operation information outputting step is performed in accordance with the second clock signal.

15. A computer system comprising:
  a microcomputer including:
    a processor fetching a program command in accordance with a first clock signal and executing the command, wherein the processor generates a command fetch signal when fetching the program command,
    a fetch counter connected to the processor to count pulses of the first clock signal based on the command fetch signal and generate an output request for processor operation information based on the count value, and
    an interface circuit connected to the fetch counter to output the operation information in response to the output request; and
  an emulator device connected to the interface circuit, wherein the emulator device monitors the operation of the microcomputer based on the operation information.

16. An integrated circuit comprising:
  a processor fetching a program command in accordance with a first clock signal and executing the command, wherein the processor generates a command fetch signal when fetching the program command;
  a fetch counter connected to the processor to count the number of fetching the program command by the processor based on the command fetch signal and generate an output request for processor operation information based on the count value; and
  an interface circuit connected to the fetch counter to output the operation information in response to the output request.

17. The integrated circuit according to claim 16, wherein the fetch counter counts in synchronism with the first clock when the command fetch signal is active.

* * * * *

UNITED STATES PATENT AND TRADEMARK OFFICE
CERTIFICATE OF CORRECTION

PATENT NO. : 6,850,879 B1
DATED : February 1, 2005
INVENTOR(S) : Kiichiro Iga

It is certified that error appears in the above-identified patent and that said Letters Patent is hereby corrected as shown below:

Column 7,
Lines 46-47, delete "the steps of".

Signed and Sealed this

Sixteenth Day of August, 2005

JON W. DUDAS
*Director of the United States Patent and Trademark Office*